Patented July 5, 1932

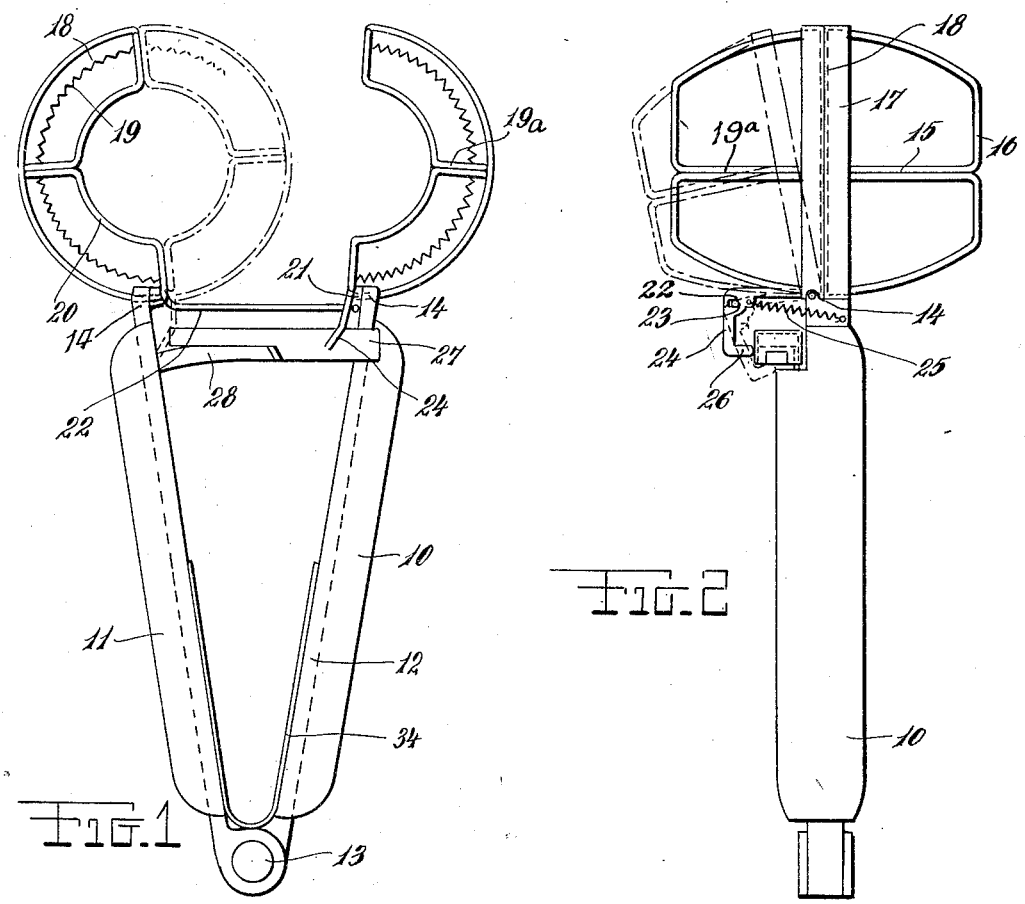
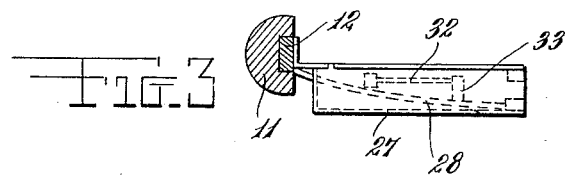
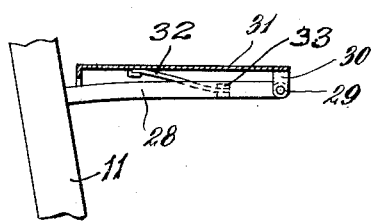

1,865,619

UNITED STATES PATENT OFFICE

WALTER DÄMMRICH, OF GRASSMERE, NEW YORK

EGG OPENER

Application filed December 10, 1930. Serial No. 501,199.

The main object of this invention is to provide a device which will divide a raw or boiled egg into halves so that the yolk may be divided from the albumen when in the raw state and when boiled the cooked meat of the egg is divided directly into halves.

Another object of the invention is to provide a device in the form of pincers and provided with a crib receptive of an egg in the raw or cooked state, so that upon application of pressure upon the crib the shell is divided into halves by toothed knife edges.

The above and other objects will become apparent in the description below in which characters of reference refer to like-named parts in the drawing.

Referring briefly to the drawing, Figure 1 is a front elevational view of the egg divider showing the cribs thereof in normally spread apart condition.

Figure 2 is a side elevational view of Figure 1.

Figure 3 is a fragmentary top plan view of one of the handles of the egg divider, showing the riser cam and crib opener barrier.

Figure 4 is a longitudinal sectional elevational view of Figure 3.

Referring in detail to the drawing, the numerals 10 and 11 indicate a pair of complemental bars which serve as handles. These bars are reinforced by legs 12 which at their lower ends are hingedly connected to each other upon a king pin 13. The legs extend beyond both ends of the bars 10 and 11, the lower ends being hinged to each other as stated, the upper ends being formed into sleeves 14. At the upper ends of the legs adjacent the hinge sleeves 14 a pair of complemental semi-circular rigid cribs or cages are mounted. These cribs comprise a skeleton framework in the shape of a quarter ovoid constructed of curved extensions 15 connected by annularly curved arms 16. The ends of these extensions 15 are permanently secured to semi-circular rims 17. These rims have a right angled flange 18 projecting therefrom whose semi-circular marginal edges are formed into serrated and pointed cutting teeth 19. These two rigid cages are mounted securely upon the legs 12 of the egg divider and are movable with their respective legs toward each other to form one half of the cage or crib in which the egg to be divided is received. Similar structures comprising cage sections 19ᵃ and 20, complemental to the rigid cages, are rotatably mounted upon the hinge sleeves 14, by providing hinge ears 21 upon the complemental and rotatable cages which cooperate with, and are connected to, the hinge sleeves 14. The lower extension of the movable cage 20 has a finger 22 extending therefrom which spans the intervening distance between both cages. This finger passes through an opening 23 formed in a bell crank 24. The bell crank extends sidewise from the movable cage 19ᵃ and its intersecting arms lie directly in the path of the finger. To spread these cages apart and divide the egg contained in the cages, a spreader mechanism is provided. The movable cages 19ᵃ and 20 are adapted to be swung through an arc as indicated by the full and broken lines in Figure 2. This mechanism comprises the bell crank 24 whose one arm which is rigid with the cage 19ᵃ. The movable cages, which are coupled to each other by the finger 22 which engages the bell crank as described, are spread apart by a coil spring 25 which is connected to one of the legs 12 and to that arm of the bell crank which is rigid with the cage 19ᵃ. The end of the other arm of the bell crank, which end is free, is provided with a tongue 26 which normally rides upon a flat apron 27. This apron is supported upon a curved cam riser 28, the latter being connected to the leg 12 of the handle 11. The free end of the cam riser 28 has an opening formed therein through which a pin 29 passes. This pin connects the cam riser 28 by means of hinge lugs 30 to a roof 31 of a tiltable housing to which the apron 27 is attached. Approximately one fourth of the apron is cut away to expose the surface of the cam riser 28. The free end of the roof 31 of the cam riser housing is normally lowered by a yieldable finger spring 32 which has its ends secured respectively to the roof 31 and to the cam riser 28 through the medium of an offset 33.

The bars 10 and 11 are normally spread away from each other by a yieldable spring member 34 which is doubled over on itself and rests upon the surfaces of the legs 12 of these bar members 10 and 11.

The device is adapted to divide eggshells into halves. The cage or crib which receives the egg is composed of four sections, each section enclosing a quarter of the egg. The normal condition of the egg divider is as shown in full lines in Figure 1. In this position both the rigid crib members on the legs 12 of the bars 10 and 11, and the movable crib sections 19ª and 20, lie in contact with each other and assume the position shown in full lines in Figure 2. The egg which is to be divided is placed in one of these half sections. When the egg is retained in this half section pressure is applied to the bars 10 and 11, causing one set of cage members to near the opposite set. As these cage members approach each other the serrated and toothed edges 19 of the flanges 18 located on both the rigid and movable cage sections are pressed tightly against the shell of the egg. These teeth on the flanges 18 have a penetrating effect upon the eggshell and shear the latter around ts entire circumference on the minor axis thereof. With the closing of the cage sections upon the egg the bell crank 24 moves from one end of the apron 27 to its opposite free end and as it arrives at the latter end, the tongue member 26 of the bell crank is tripped and falls from the apron 27 and lands upon the remotely placed surface of the cam riser 28. With this operation the spring 25 yieldably pulls upon the cage sections 19ª and 20, and that half of the egg and shell contained in this portion of the cage sections is completely divided from the opposite half of the egg, after which in the case of a raw egg the yolk may be separated from the albumen. As pressure upon the bars 10 and 11 by the clenched hand is released, the spring 34 again spreads the legs 12 apart and with this movement the tongue 26 which now rests upon the riser 28 will ride upwardly upon the cam riser 28 and thence jump upon the apron 27. In passing through this path the tongue 26 will lift the housing, of which the apron 27 forms a part, against the tension of the spring 32, and when said tongue 26 has completed its movement the spring 32 will again return the housing to its lowered position where it rests upon the riser 28.

It is to be noted that certain changes in form and construction may be made without departing from the spirit and scope of the invention.

I claim:

1. An egg divider comprising a pair of legs hinged to each other, a cage section rigidly connected to each leg, said rigid cage sections being adapted to envelop a half of an egg, a movable cage section hingedly secured to each leg, said movable cage sections being complemental to the rigid cage sections, means bounding said movable and rigid cage sections for dividing an egg around its circumference upon closing of said legs, and means for spreading said hinge cage sections away from said rigid cage sections upon closure of said legs.

2. An egg divider comprising a pair of legs hinged to each other, a cage section rigidly connected to each leg, said rigid cage sections being adapted to envelop a half of an egg, a movable cage section hingedly secured to each leg, said movable cage sections being complemental to the rigid cage sections, means bounding said movable and rigid cage sections for dividing an egg around its circumference upon closing of said legs, and means for rotating said hinge cage sections away from said rigid cage sections upon complete closure of said legs.

3. An egg divider comprising a pair of legs hinged to each other, a cage section rigidly connected to each leg, said rigid cage sections being adapted to envelop a half of an egg, a movable cage section hingedly secured to each leg, said movable cage sections being complemental to the rigid cage sections, means bounding said movable and rigid cage sections for dividing an egg around its circumference upon closing of said legs, means for rotating said hinge cage sections away from said rigid cage sections upon complete closure of said legs, and means for returning said hinge cage sections to position adjacent said rigid sections upon spreading of said legs.

4. An egg divider comprising a pair of mutually hinged legs, means for spreading said legs apart, a pair of complemental rigid cage sections, one cage section being rigidly mounted on each leg, a hinged complemental cage section secured movably to each leg, means for rotating said hinged cage members away from said rigid cage members upon closure of said cage, means for moving said hinged cage members in unison, and means for returning said hinge cage members to original position upon opening of said cage members.

5. An egg divider comprising a pair of mutually hinged legs, means for spreading said legs apart, a pair of complemental rigid cage sections, one cage section being rigidly mounted on each leg, a hinged complemental cage section secured movably to each leg, means for rotating said hinged cage members away from said rigid cage members upon closure of said cage, means for moving said hinged cage members in unison, and means for returning said hinge cage members to original position upon opening of said cage members, a bell crank rigidly connected to one of said hinge cage members, means for pulling said bell crank to rotate said hinge cage members to spread apart position with respect to said rigid cage members.

6. An egg divider comprising a pair of mutually hinged legs, means for spreading said legs apart, a pair of complemental rigid cage sections, one cage section being rigidly mounted on each leg, a hinged complemental cage section secured movably to each leg, means for rotating said hinged cage members away from said rigid cage members upon closure of said cage, means for moving said hinged cage members in unison and means for returning said hinge cage members to original position upon opening of said cage members, a bell crank rigidly connected to one of said hinge cage members, a spring secured to one of said legs and to said bell crank and said spring being adapted to spread one of said hinge cages apart from its complemental rigid cage and means for retaining said hinge cage members in abutting position on said rigid cage members until said legs have closed said cage sections.

7. An egg divider comprising a pair of mutually hinged legs, means for spreading said legs apart, a pair of complemental rigid cage sections, one cage section being rigidly mounted on each leg, a hinged complemental cage section secured movably to each leg, means for rotating said hinged cage members away from said rigid cage members upon closure of said cage, means for moving said hinge cage members in unison and means for returning said hinge cage members to original position upon opening of said cage members, a bell crank rigidly connected to one of said hinge cage members, a spring secured to one of said legs and to said bell crank and said spring being adapted to spread one of said hinge cages apart from its complemental rigid cage, a housing mounted on one of said legs, a hinge apron forming part of said housing and having a flat surface, one end of said bell crank being adapted to ride upon said apron to retain one of said hinge cage sections in closed position.

8. An egg divider comprising a pair of mutually hinged legs, means for spreading said legs apart, a pair of complemental rigid cage sections, one cage section being rigidly mounted on each leg, a hinged complemental cage section secured movably to each leg, means for rotating said hinged cage members away from said rigid cage members upon closure of said cage, means for moving said hinge cage members in unison, a cam riser supporting said hinge housing said cam riser being mounted on one of said legs, said bell crank being adapted to trip from the end of said apron and come to rest on said cam riser upon completion of closing of said cage sections, said cam riser being adapted to move said bell crank and close one of said hinge cages to a position adjacent its complemental rigid cage, a bell crank rigidly connected to one of said hinge cage members, a spring secured to one of said legs and to said bell crank and said spring being adapted to spread one of said hinge cages apart from its complemental rigid cage, a housing mounted on one of said legs, a hinge apron forming part of said housing and having a flat surface, one end of said bell crank being adapted to ride upon said apron to retain one of said hinge cage sections in closed position.

In testimony whereof I affix my signature.

WALTER DÄMMRICH.